United States Patent
Silakov et al.

(10) Patent No.: US 12,019,504 B1
(45) Date of Patent: Jun. 25, 2024

(54) AUTOMATED SOFTWARE CRASH RECOVERY IN HYPERCONVERGED SYSTEMS USING CENTRALIZED KNOWLEDGE DATABASE

(71) Applicant: Virtuozzo International GmbH, Schaffhausen (CH)

(72) Inventors: Denis Silakov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 50 days.

(21) Appl. No.: 16/732,215

(22) Filed: Dec. 31, 2019

(51) Int. Cl.
  *G06F 11/00* (2006.01)
  *G06F 9/455* (2018.01)
  *G06F 11/07* (2006.01)
  *G06F 11/14* (2006.01)

(52) U.S. Cl.
  CPC ........ *G06F 11/079* (2013.01); *G06F 9/45558* (2013.01); *G06F 11/0787* (2013.01); *G06F 11/1471* (2013.01); *G06F 2009/45591* (2013.01)

(58) Field of Classification Search
  CPC .............. G06F 11/079; G06F 11/0787; G06F 11/1471; G06F 8/656; G06F 9/45558; G06F 2009/4557; G06F 2009/45591
  USPC ....................................................... 714/1–57
  See application file for complete search history.

(56) References Cited

U.S. PATENT DOCUMENTS

| | | | | |
|---|---|---|---|---|
| 7,321,992 B1* | 1/2008 | Vellore | ............... | H04L 41/0631 714/13 |
| 8,423,997 B2* | 4/2013 | Nakai | ............... | G06F 9/45558 714/21 |
| 9,189,317 B1* | 11/2015 | Marimuthu | ......... | G06F 11/3065 |
| 9,189,355 B1* | 11/2015 | Moturu | ............... | G06F 11/3495 |
| 2008/0155346 A1* | 6/2008 | Britt | ............... | H04L 41/0631 714/43 |
| 2011/0173483 A1* | 7/2011 | Lynn | ............... | G06F 11/0715 714/2 |
| 2013/0042147 A1* | 2/2013 | Tonouchi | ............. | G06F 11/0781 714/37 |
| 2014/0172371 A1* | 6/2014 | Zhu | ............... | G06F 11/0703 702/185 |
| 2015/0347220 A1* | 12/2015 | Hermany | ............ | G06F 11/0787 714/48 |
| 2015/0347264 A1* | 12/2015 | Mohammed | ............ | H04L 67/10 714/45 |
| 2016/0179600 A1* | 6/2016 | Joshi | ............... | G06F 11/3006 714/37 |

(Continued)

*Primary Examiner* — Sarai E Butler
(74) *Attorney, Agent, or Firm* — Bardmesser Law Group (57) ABSTRACT

A system and method for detecting and fixing crashes in a cluster environment, including detecting a crash; generating a call trace of the crash; generating a crash ID based on the call trace; checking if the crash ID matches a known crash ID from a knowledge base; when the crash ID matches, applying an automatic recovery procedure, including any of (a) restarting a service that caused the crash; (b) removing and replacing a software package that caused the crash; (c) updating software that caused the crash; and (d) rebooting a machine where the crash occurred; when the crash ID does not match, (a) collecting logs on the machine where the crash occurred; (b) collecting logs from any virtual environments on the machine where the crash occurred; and (c) generating crash ID and sending the crash ID and the logs to the knowledge base.

14 Claims, 5 Drawing Sheets

(56) References Cited

U.S. PATENT DOCUMENTS

| | | | |
|---|---|---|---|
| 2016/0342451 A1* | 11/2016 | Ly | G06F 11/0769 |
| 2017/0097875 A1* | 4/2017 | Jess | G06F 11/1092 |
| 2017/0192840 A1* | 7/2017 | Jeansonne | H04L 1/0061 |
| 2020/0180148 A1* | 6/2020 | S Nanal | G06F 11/0793 |
| 2020/0374353 A1* | 11/2020 | Walwadkar | G06F 11/2038 |

* cited by examiner

AUTOMATED SOFTWARE CRASH RECOVERY IN HYPERCONVERGED SYSTEMS USING CENTRALIZED KNOWLEDGE DATABASE

BACKGROUND OF THE INVENTION

Field of the Invention

The invention relates to crash recovery, particularly crash recovery in a complex clustered server computing environment.

Description of the Related Art

Software applications can crash from time to time. In some cases crashed applications can restart themselves automatically, but often human intervention is required to get the system back to a working state. The more information we have about the problem—the more accurate fix we can suggest. And the faster we get the data—the faster the fix is developed and applied.

Tools already exist that detect different kinds of problems (such as application crashes) and collect various information that can be useful for problem analysis. Examples of such tools include ABRT (Automated Bug Reporting Tool), Aport and others.

However, existing tools are aimed to collecting data from a single machine and don't meet all requirements of more complex systems (e.g., modern hyperconverged systems)—clusters consisting of many physical servers which uses distributed data storage and host numerous virtual environments. In such a system, every physical machine and virtual environment is tightly coupled with other parts in the cluster.

For example, a bug in cluster management service on one node can lead to a problem in cluster services on another node; a bug in virtualization system can lead to a problem inside virtual environment and vice versa—a crash inside virtual environments can lead to problems on physical machines; and so on. To analyze such problems, it is not enough to collect data from a single machine—one should also analyze virtual environments and other machines in the cluster.

In addition, existing tools can't perform any recovery actions by themselves. In many cases recovery actions are trivial, but they are not universal. Each crash requires its own action which often becomes known only after developers get some information about the problem and investigate its reasons.

A common practice for solving this problem is to create a knowledge base of crash incidents and ways to recover the system after them. Such knowledge bases can be used by support teams or by users themselves. So if a user experiences anapplication crash that already happened in the past and for which a recovery procedure is already known, he can look for this procedure in the knowledge base and perform the recovery.

SUMMARY OF THE INVENTION

The invention relates to automatic crash recovery in hyperconverged (cluster) systems that substantially obviates one or more disadvantages of the related art.

In an exemplary embodiment, a system and method for detecting and fixing crashes in a cluster environment, including detecting a crash; generating a call trace of the crash; generating a crash ID based on the call trace; checking if the crash ID matches a known crash ID from a knowledge base; when the crash ID matches, applying an automatic recovery procedure, including any of (a) restarting a service that caused the crash; (b) removing and replacing a software package that caused the crash; (c) updating software that caused the crash; and (d) rebooting a machine where the crash occurred; when the crash ID does not match, (a) collecting logs on the machine where the crash occurred; (b) collecting logs from any virtual environments on the machine where the crash occurred; and (c) generating crash ID and sending the crash ID and the logs to the knowledge base.

Optionally, the logs from the virtual environments include a list of applications, a list of processes and information about crashes. Optionally, the logs on the machine include crashed application logs, general system information and cluster services logs. Optionally, the knowledge base is hosted on a report server. Optionally, the automatic recovery procedure also includes any of removal of damaged files that can prevent correct application work; reboot of host OS or guest OS of a Virtual Machine; intrusion into guest OS; adding new software; removing dangerous files; migration of a virtual environment to another machine in the cluster; and applying a "live" patch for a running process. Optionally, the crash is caused by a management subsystem that manages distributed data chunk storage, and wherein logs are collected for all management subsystems for all nodes of the cluster before applying the automatic recovery procedure. Optionally, the detecting steps detects any of crashes of binary applications caused by incorrect work with memory; crashes of applications written in interpreted languages; crashes of host OS kernel; crashes of Guest OS kernel; hardware problems detected and reported by CPU MCE (Machine Check Exception); incorrect requests to graphical subsystem; crashes of processes inside virtual machines; crashes of processes inside containers; errors in reading or writing data from/to distributed storage.

In a cluster environment, a system for detecting and fixing crashes, including means for detecting a crash; means for generating a call trace of the crash; means for generating a crash ID based on the call trace; means for checking if the crash ID matches a known crash ID from a knowledge base; when the crash ID matches, means for applying an automatic recovery procedure, including any of (a) restarting a service that caused the crash; (b) removing and replacing a software package that caused the crash; (c) updating software that caused the crash; and (d) rebooting a machine where the crash occurred; when the crash ID does not match, (a) means for collecting logs on the machine where the crash occurred; (b) means for collecting logs from any virtual environments on the machine where the crash occurred; and (c) means for generating crash ID and sending the crash ID and the logs to the knowledge base. The means above is a software component or module running under the host OS or, where appropriate, under the Guest OS of a VM.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The following definitions are used throughout the description.

VE—Virtual Environment, a type of environment that supports program code execution, where at least a part of the real hardware and software required for running program code are presented as their virtual analogs. From the point of view of the user, the code in VE runs as if it were running on the real computing system.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor as a supervisory component.

A "Container", is one type of a Virtual Environment (VE) running on the same hardware system with a single shared OS kernel and sharing most of the system resources, where isolation of Virtual Execution Environments is implemented on a namespace level. A Virtual Private Server (VPS), is a type of a container, which is a closed set, or collection, of processes, system resources, users, groups of users, objects and data structures, that virtualizes the host OS through the kernel abstraction layer. Each VPS has its own ID, or some other identifier, that distinguishes it from other VPSs. A container acts as an isolated virtual server within a single machine, where multiple sets of application services are organized on a single hardware node by placing each into an isolated virtual Container.

The VPS/Container offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc. In other words, the full range of system administrator functions is desirable, as if the VPS were a dedicated remote server, with the existence of the VPS being transparent from the perspective of both the VPS user and the VPS administrator. (Another type of container is a stateless type container, to which the concepts described herein apply as well.)

A hypervisor is a component for virtualizing hardware computer resources and creating and managing Virtual Machines.

The present invention is directed to improving the automated crash detection process and analysis process to be aware of virtual environments and other machines in a cluster, and combining it with automated crash recovery using information from a centralized knowledge base. To that end, a monitoring tool is used that detects software crashes, collects cluster-wide information required for problem analysis and then contacts the knowledge base (often supplied by a vendor of a particular problematic application) for possible recovery actions, and applying them, if they exist, automatically.

The crash processing looks as follows:

First, monitoring services are started under the host Operating System of a computer (e.g., computing device 20 shown in FIG. 5) in a cluster, to detect different kinds of problems, for example, at least one of:

crashes of binary applications caused by incorrect work with memory;

crashes of applications written in interpreted languages;

crashes of OS kernel;

hardware problems detected and reported by CPU ("Machine Check Exception, MCE");

incorrect requests to graphical subsystem (X11 errors);

crashes of processes inside virtual environments (virtual machines and containers);

errors in reading or writing data from/to a distributed storage.

Once a problem is detected, information is collected, which is required for problem analysis, at least one of:

a crash call trace or a version of crashed application or a name of crashed function;

all needed data from the machine where the crash happened;

if the machine is a part of a cluster and the crashed program is a part of cluster management infrastructure, then log files are collected from other cluster management services in order to analyze which services interfered from the crashed one when the problem happened;

in case of a crash of cluster services—information regarding crashed (and possibly still functioning) services in other nodes in the cluster;

crash of a hypervisor if one is present;

if the machine runs any Virtual Environment (VE), such as virtual machines and/or containers, and the crashed program is a part of the vitalization management system (e.g., a hypervisor), or the crash has occurred within the VE, then the internal state of all VEs on the machine is analyzed, in particular:

a list of installed application is collected;

a list of running processes is saved;

the process checks if any problem happened inside the VE (application crash, host OS kernel crash, crashes of guest OS services, issues with emulated hardware, etc.);

crash of application inside the VE.

Based on the collected information, a problem identifier is generated that will be common for similar problems on other systems. For example, this can be a hash of a crash call trace (a sequence of function calls), or a name and version of crashed application combined with name of the crashed function, etc.

In some aspects, the identifier is generated after all information is collected. In another aspect, the identifier is generated just after collecting the information needed for its generation is obtained. In this case, in some aspects, more detailed information is collected only after receiving a response from knowledge base about an absence of the recovery procedure.

In one aspect, the problem identifier is sent to a centralized knowledge base (KB) system. The knowledge base can be, in some aspects, accessible to the computer of the cluster via a network (e.g., via the Internet or an intranet or a local network).

In one aspect, if the problem is already known to the KB and it has a recovery procedure for it, the recovery procedure is sent back to client and automatically launched.

Automated recovery actions can include at least one of:
update of crashed application or related software to certain versions where a fix for the cause of the crash exists;
removal of certain files that can prevent correct application work (e.g., damaged data files);
restart of services and other programs;
reboot of host OS or guest OS;
intrusion into guest OS (here the same actions that apply for the host OS (forcing software updates, removing dangerous files, etc.) can apply to the guest OS);
forcing software updates;
adding new software;
removing dangerous files of certain services and programs;
migration of virtual environment to another machine in the cluster;
applying "live" patch for a running process (e.g., applying Ready Kernel or Kpatch patches for the LINUX kernel).

In some aspects, if the problem is not yet known, detailed information about the crash is sent to the centralized server for further analysis.

Figure 1:
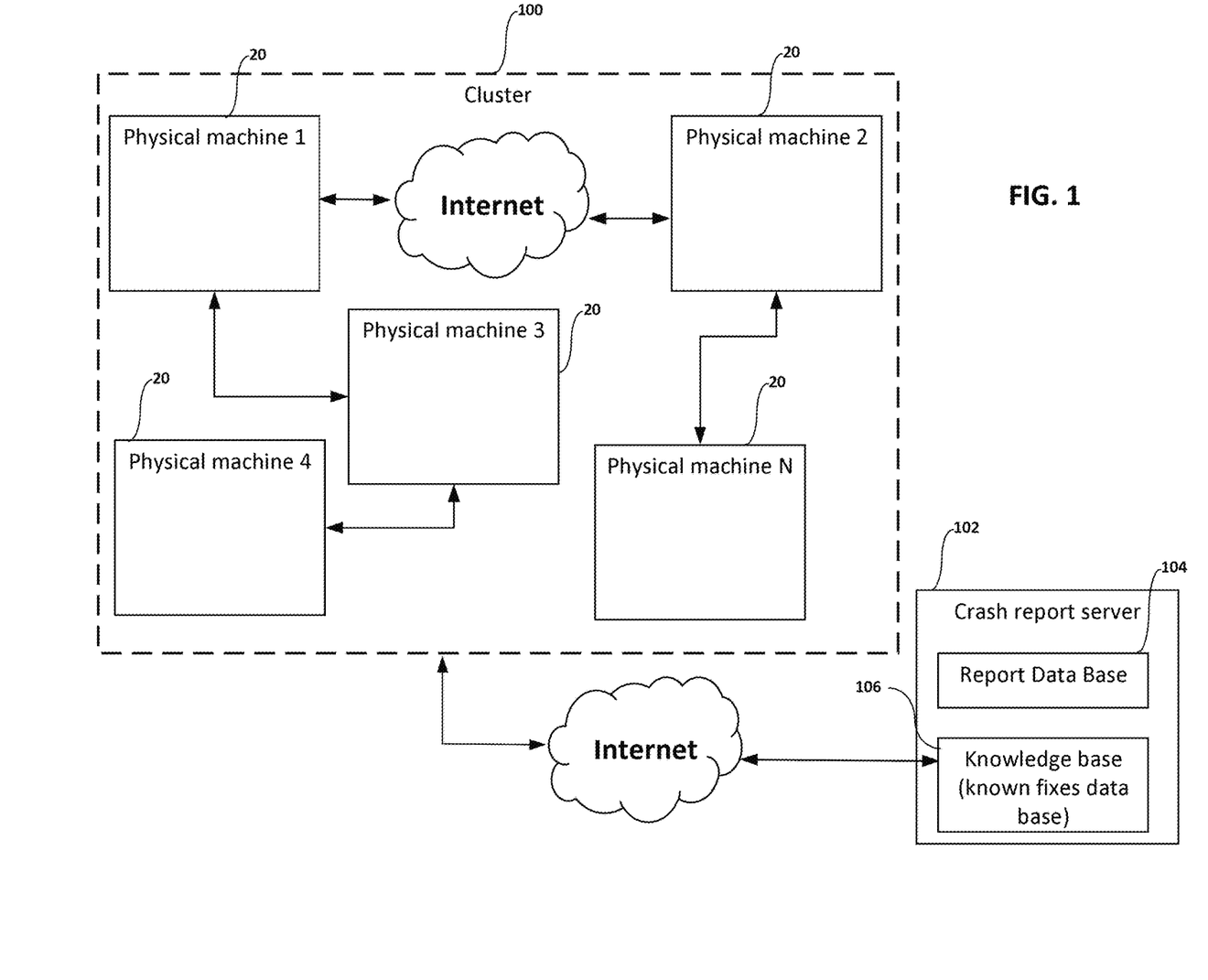
FIG. 1 illustrates a type of system where the invention may be applied.

FIG. 1 illustrates a type of system where the invention may be applied. As shown in FIG. 1, a cluster 100 is formed by a plurality of physical machines 20. The machines 20 of the cluster 100 may be connected to each other using, for example, a LAN, a WAN, or the internet, or some combination of the above. The cluster also communicates over the internet or an intranet or a local network to a crash report server 102, which includes a report database 104 and a knowledge base (KB) 106 that contains fixes to known problems.

Figure 2:
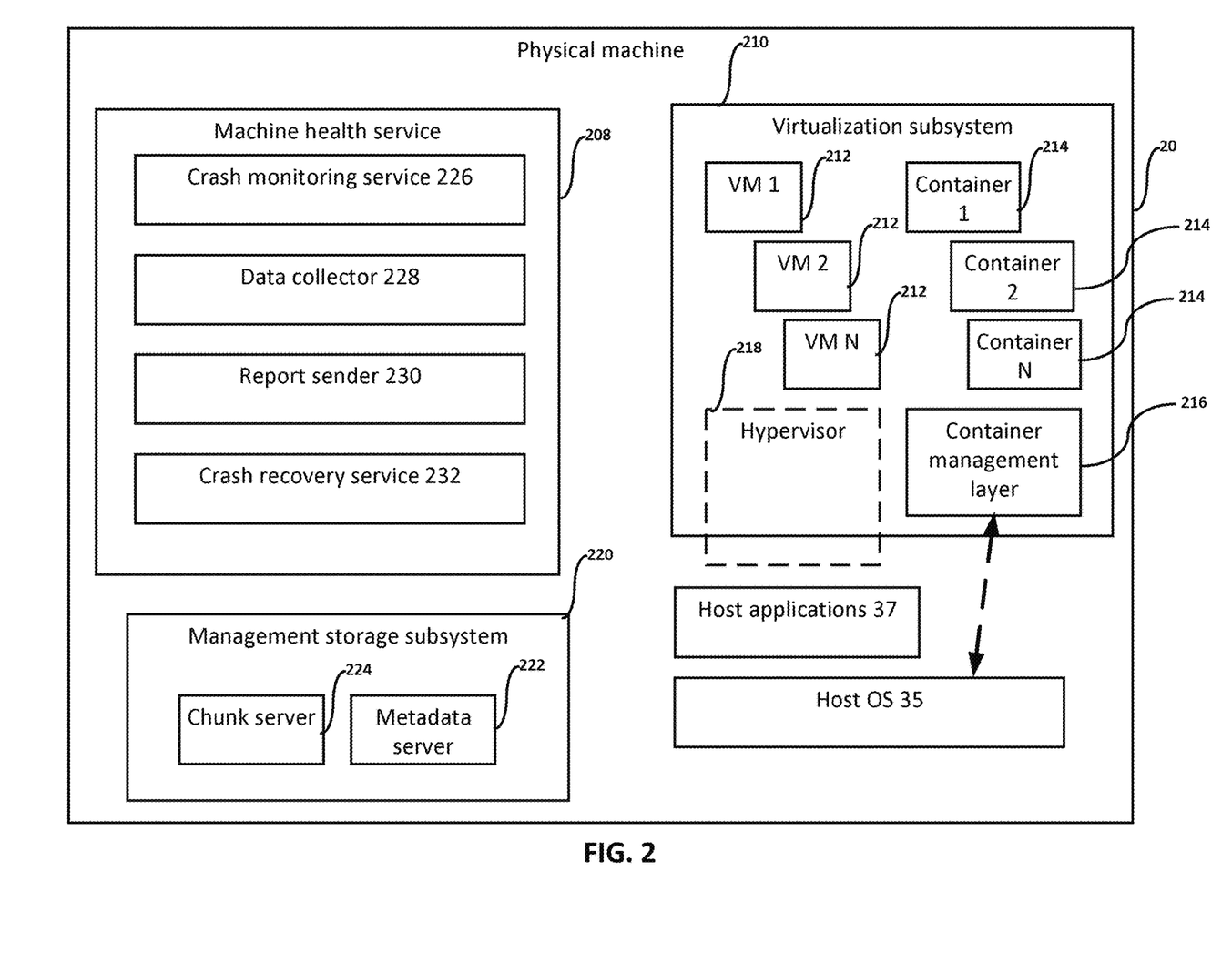
FIG. 2 illustrates a typical configuration of a physical machine.

FIG. 2 illustrates a typical configuration of a physical machine 20. The machine 20 executes a machine health service component 208, which has the same privilege level as the host OS, and which in turn includes a crash monitoring service 226, a data collector 228, a report sender 230 and a crash recovery service 232.

In one aspect, a management subsystem 220 includes a distributed storage, which in turn includes a chunk server 224 and a metadata server 222. (See generally U.S. patent Ser. No. 10/185,597, incorporated herein by reference in its entirety.) (In some aspects, a management subsystem 220 includes any software that is responsible for management of the cluster (e.g., any cluster management tools, such as load balancers, etc.) A log is collected from the whole cluster if a problem with the management subsystem is detected, or if there is a cluster-wide problem affecting multiple machines. This is primarily applicable to situations when the crashes are related to storage issues (e.g., with the data chunks being stored on different servers, and the storage elements behaving incorrectly).

The machine 20 may be a dedicated server, or it may be running virtualization environments (VEs). In that case, Virtual Machines 212 may be running under a hypervisor 218. Each VM typically includes a Guest OS, and guest applications (e.g., webserver, mail server, database server, game server, etc). In one aspect, each VM also includes tools/agent component(s) (not shown in the figures) that permit host-side code to access VM data about crashes (rather than treating a VM as a black box). In some aspects, the system may also include containers 214, which are managed by the container management layer (kernel abstraction layer) 216, and which virtualize the host OS 35. In some aspects, each container can also execute applications within it (such as webserver, mail server, game server, database server, etc.), where the applications' data is isolated from other containers, but the application code may be shared using copy-on-write mechanism. Since the containers are ultimately running under the host OS, the host-side component(s) have visibility into the containers, and can detect the crash directly (and obtain a call trace if necessary).

Figure 3:
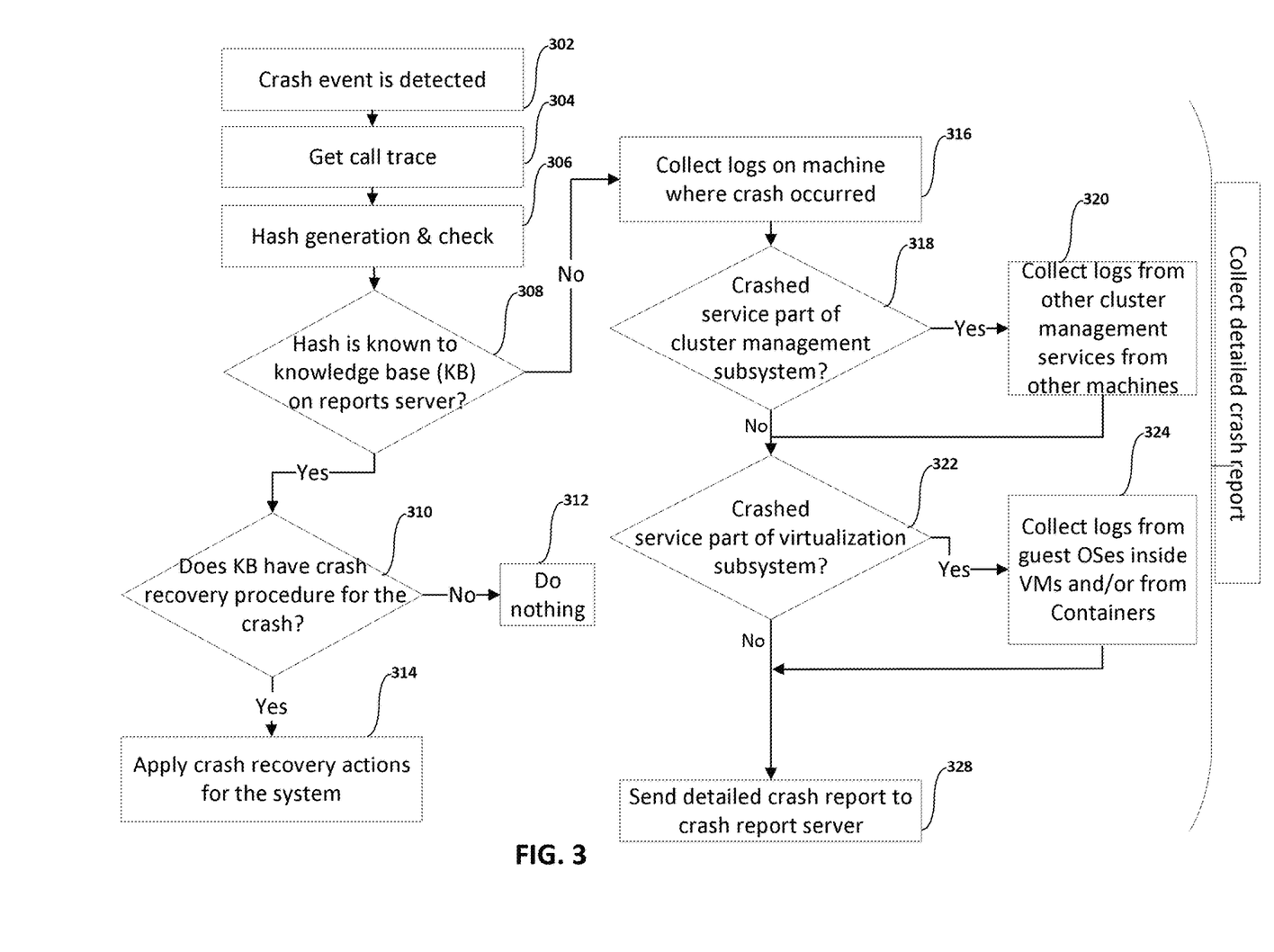
FIG. 3 illustrates the process of addressing crashes, according to one embodiment of the invention.

FIG. 3 illustrates the process of addressing crashes, according to one embodiment of the invention. As shown in FIG. 3, once a crash event is detected (302), the get call trace step (304) is performed to generate a sequence of function names that were called, at the location/memory address of the crash during the instruction execution sequence. Then, a problem identifier (e.g., hash) is generated (306), as discussed above, and is checked for whether a matching problem identifier exists in the knowledge base. I.e., a request is send to KB (which may be an external resource accessible over a network) and a response about existance of recovery procedure is received (e.g., via the internet or a local network). In step 308, if the corresponding problem identifier exists in the knowledge base (KB) on the report server, then, in step 310, the system checks if the KB has a crash recovery procedure for this particular crash. If there is no such recovery procedure, then the process terminates in step 312, and the admin will have to deal with the crash manually. If a crash recovery procedure exists, then it is received from the report server and applied (314), see additional detail in FIG. 4.

In one aspect, if, in 308, the problem identifier is not known to the KB (i.e., KB reported that there is no such problem identifier in it), then the system collects logs on the machine where the crash occurred (316). The system then checks if the crashed service is part of the cluster management subsystem 220 (step 318). If it is, then it will collect logs from other machines, and from other management subsystems 220 running on those machines (320). The system checks if the crashed service was running in a virtual environment, i.e., it is part of a virtualization subsystem (step 322). If it is, then the system will collect logs from the virtualization entities running on the machine where the crash occurred, such as the VMs and/or Containers, and any applications running in them, and possibly Guest OS logs from the VMs (step 324). The problem identifier is then sent to crash report server (step 328).

Figure 4:
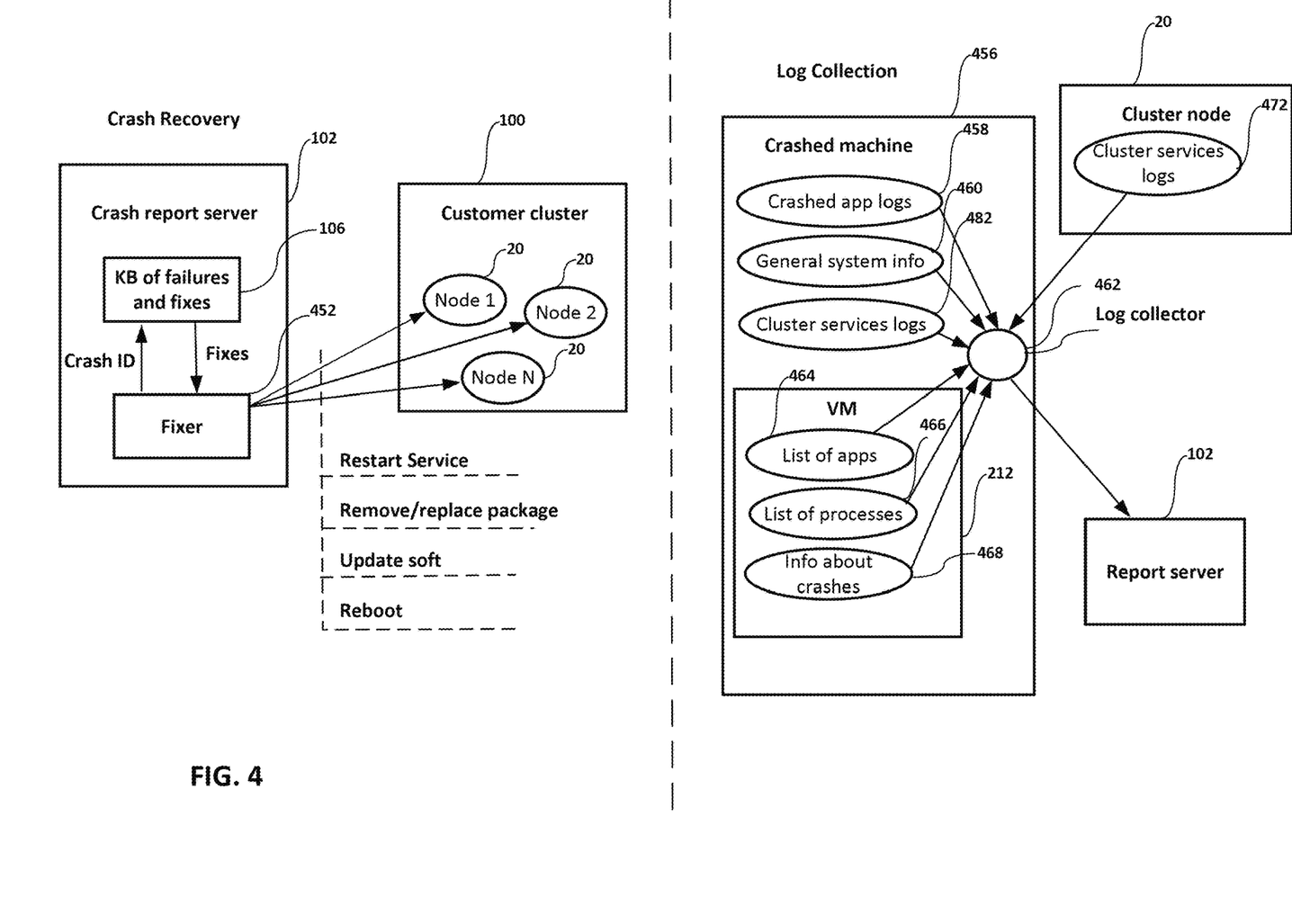
FIG. 4 illustrates log collection and crash recovery actions in more detail.

FIG. 4 illustrates log collection and crash recovery actions in more detail. As shown in the figure on the left, the crash report server 102 includes the knowledge base 106 and a fixer component 452, which determines, based on the crash ID (e.g., the hash discussed above), which specific action needs to be taken to address the crash. Some of the options include restarting the service, removing and/or replacing and/or patching the application code, updating the software, and rebooting the machine 20 of the cluster 100.

As shown on the right of the figure, a crashed machine 456 runs a log collection process includes colleting crashed application logs (458), collecting general system information (460), collecting cluster services logs (482). If the machine 20 supports virtualization, such as VMs 212 or containers are running on it, the collection may also include collecting the list of applications running in the VM (464), the list of processes (466), and any other available information about the crash (468). Additionally, any cluster services logs 472 are provided to the log collector 464. All the logs are provided to a log collector component (462), which in turn sends them to the report server 102.

In some aspects, information required for problem analysis can contain user-sensitive data, so user approval can be requested before sending it. Alternatively, either system admin or VE user can be given an option to set the settings whether to automatically send sensitive and/or non-sensitive data to the KB.

Figure 5:
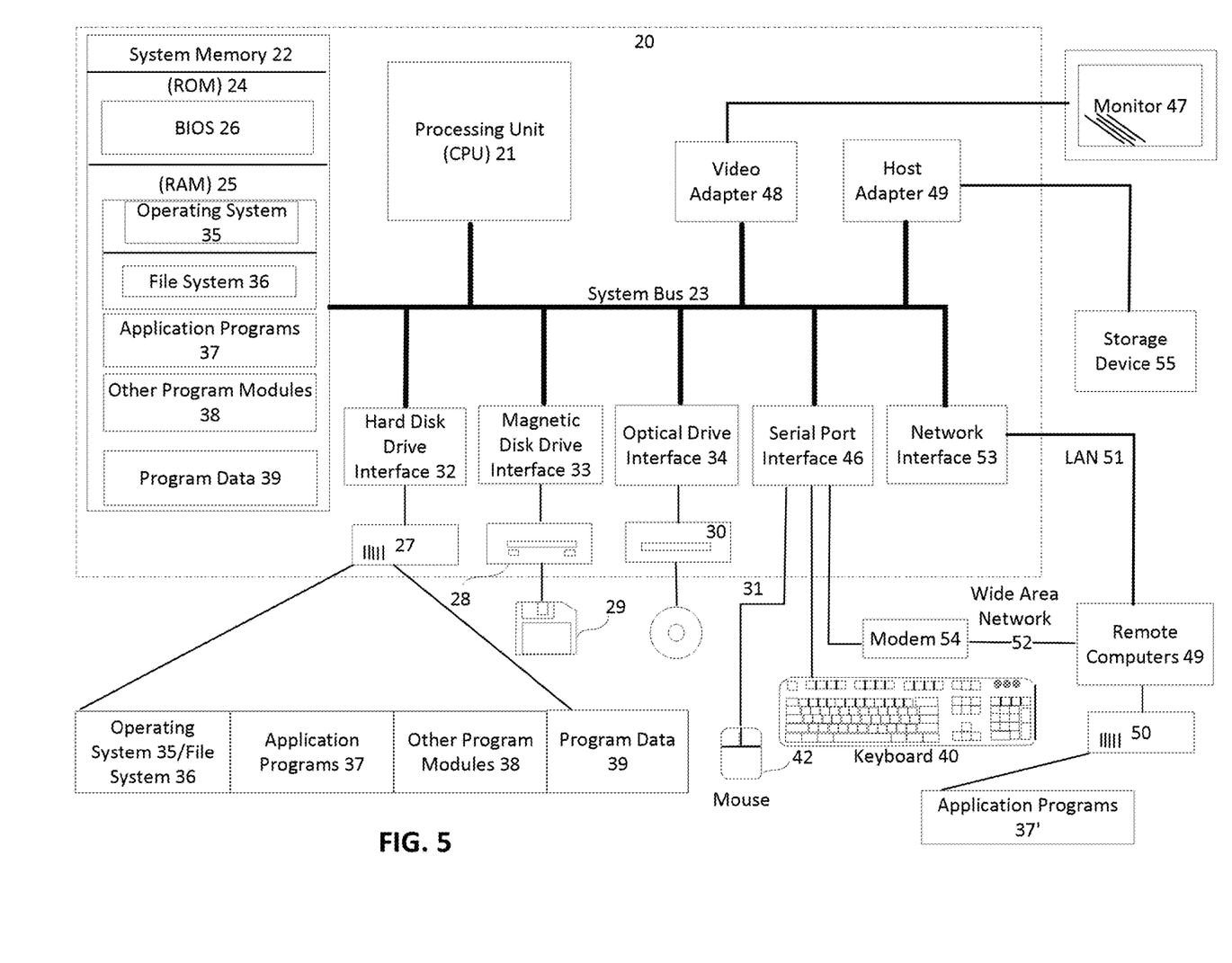
FIG. 5, shows an exemplary system, such as a general purpose computing device in the form of a host computer or a server node, for implementing the invention.

With reference to FIG. 5, an exemplary system for implementing the invention includes a general purpose computing device in the form of a host computer or a server node 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar) The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. In a cluster environment, a computer-implemented method for detecting and fixing crashes of a software application on a machine in a cluster, the method comprising:

detecting a crash of the software application that is running inside a virtual environment, the virtual environment implemented on the machine in the cluster;

generating a call trace of the crash;

generating a crash ID based on the call trace;

sending the crash ID to a report server, and determining, based on a response of the report server, whether the crash ID matches a known crash ID from a knowledge base of the report server;

when the crash ID matches, upon receiving an automatic recovery procedure corresponding to the crash ID, applying the automatic recovery procedure including changing one or more files of one or more software packages on the machine and restarting on the machine one or more services corresponding to the one or more software packages;

when the crash ID does not match, collecting logs from the virtual environment within which the crash occurred, collecting logs of virtualization services running on the machine and collecting logs of cluster management services running on each machine in the cluster; and sending the logs to the report server.

2. The method of claim 1, wherein the logs from the virtual environment include a list of applications, a list of processes and information about crashes.

3. The method of claim 1, wherein the automatic recovery procedure also includes any of removal of damaged files that can prevent correct application work;
intrusion into guest OS;
adding new software;
removing dangerous files;
migration of a virtual environment to another machine in the cluster; and
applying a "live" patch for a running process.

4. The method of claim 1, wherein the crash is caused by a management subsystem that manages distributed data chunk storage, and wherein logs are collected for all management subsystems for all nodes of the cluster before applying the automatic recovery procedure.

5. The method of claim 1, wherein the detecting steps detects any of:

crashes of binary applications caused by incorrect work with memory;
crashes of applications written in interpreted languages;
incorrect requests to graphical subsystem; and
errors in reading or writing data from/to distributed storage.

6. In a cluster environment, a system for detecting and fixing crashes, the system comprising: a cluster formed of a plurality of physical machines, each machine having a processor coupled to a memory, the memory storing computer code that configures the processor to perform the steps of detecting a crash of the software application that is running inside a virtual environment, the virtual environment implemented on the machine in the cluster, including detecting any of (i) crashes of binary applications caused by incorrect work with memory; (ii) crashes of applications written in interpreted languages; (iii) incorrect requests to graphical subsystem; and (iv) errors in reading or writing data from/to distributed storage; generating a call trace of the crash; generating a crash ID based on the call trace; checking whether the crash ID matches a known crash ID from a knowledge base hosted on a report server; when the crash ID matches, applying an automatic recovery procedure corresponding to the matching crash ID including changing one or more files of one or more software packages on the machine and restarting on the machine one or more services corresponding to the one or more software packages; when the crash ID does not match, collecting logs on the physical machine where the crash occurred, wherein the logs include cluster services logs; collecting logs from the virtual environment within which the crash of the software application occurred; and sending the logs to the report server.

7. The system of claim 6, wherein the logs from the virtual environment include a list of applications, a list of processes and information about crashes.

8. The system of claim 6, wherein the logs on the physical machine include crashed application logs and general system information.

9. The system of claim 6, wherein the knowledge base is hosted on a report server.

10. The system of claim 6, wherein the automatic recovery procedure also includes any of removal of damaged files that can prevent correct application work;
reboot of host OS or guest OS of a Virtual Machine;
intrusion into guest OS;
adding new software;
removing dangerous files;
migration of a virtual environment to another physical machine in the cluster; and
applying a "live" patch for a running process.

11. The system of claim 6, wherein the crash is caused by a management subsystem that manages distributed data chunk storage, and wherein logs are collected for all management subsystems for all nodes of the cluster before applying the automatic recovery procedure.

12. The system of claim 6, wherein when the crash occurs in a cluster management subsystem, the logs include a state of cluster management subsystems from other physical machines.

13. The system of claim 6, wherein when the crash occurs in a virtualization subsystem, the logs include a state of all the virtual machines and/or containers managed by the virtualization subsystem.

14. A computer program product stored on a non-transitory medium for detecting and fixing crashes of a software application on a physical machine in a cluster, the product comprising:

computer program code for detecting a crash of the software application that is running inside a virtual environment, the virtual environment implemented on the machine in the cluster;
computer program code for generating a call trace of the crash;
computer program code for generating a crash ID based on the call trace;
computer program code for sending the crash ID to a report server, and determining, based on a response of the report server, whether the crash ID matches a known crash ID from a knowledge base of the report server;
when the crash ID matches, upon receiving an automatic recovery procedure corresponding to the crash ID, computer program code for applying the automatic recovery procedure including changing one or more files of one or more software packages on the machine and restarting on the machine one or more services corresponding to the one or more software packages;
when the crash ID does not match, computer program code for collecting logs from the virtual environment within which the crash occurred, collecting logs of virtualization services running on the machine and collecting logs of cluster management services running on each machine in the cluster; and computer program code for sending the logs to the report server.

\* \* \* \* \*